United States Patent [19]

Trost

[11] 4,288,860
[45] Sep. 8, 1981

[54] DYNAMIC STORAGE SYNCHRONIZER USING VARIABLE OSCILLATOR AND FIFO BUFFER

[75] Inventor: John R. Trost, Anoka, Minn.

[73] Assignee: Sperry Corporation, New York, N.Y.

[21] Appl. No.: 63,312

[22] Filed: Aug. 2, 1979

[51] Int. Cl.³ .............................................. G06F 5/06
[52] U.S. Cl. ................................................. 364/900
[58] Field of Search ... 364/200 MS File, 900 MS File

[56] References Cited

U.S. PATENT DOCUMENTS 3,406,378 10/1968 Bradford ............................ 364/900
4,040,027 8/1977 Van Es et al. ..................... 364/900
4,193,123 3/1980 Meinke ............................... 364/900

OTHER PUBLICATIONS

R. A. Skov and E. G. Newman, "Buffer System," *IBM T.D.B.*, vol. 2, No. 5, Feb. 1960, pp. 86-89.

Primary Examiner—Raulfe B. Zache
Attorney, Agent, or Firm—Kenneth T. Grace; William E. Cleaver; Marshall M. Truex

[57] ABSTRACT

A method of and apparatus for optimizing the data transfer rate from a dynamic storage subsystem to an asynchronously clocked requestor using a variable rate oscillator and a first-in-first-out or FIFO buffer. On writing data into the dynamic storage subsystem, data is transferred from the requestor to the FIFO buffer and the variable rate oscillator clocks the data from the FIFO buffer into the dynamic storage subsystem at some relatively slow rate. If the FIFO buffer begins to fill, the frequency of the variable rate oscillator increases causing data to be clocked from the FIFO buffer at a higher rate. On reading data from the dynamic storage subsystem, the variable rate oscillator begins at a maximum frequency clocking data into the FIFO buffer from where it is transferred to the requestor. If the FIFO buffer beings to fill up, the frequency of the variable rate oscillator is decreased. Therefore, for both reading and writing, data is always transferred via the FIFO buffer and the frequency of the variable rate oscillator controlling the dynamic storage subsystem is determined by the amount of data stored in the FIFO buffer.

5 Claims, 10 Drawing Figures

Fig. 9

DYNAMIC STORAGE SYNCHRONIZER USING VARIABLE OSCILLATOR AND FIFO BUFFER

BACKGROUND OF THE INVENTION

The present invention relates generally to dynamic storage subsystems and more specifically to control techniques for dynamic storage subsystems.

In dynamic storage subsystems using technologies such as charge coupled devices (i.e., CCD), an internal clock is used to control the dynamic operation of the storage devices. This clock has some minimum rate required to reliably store data. Operation of the CCD storage subsystem at higher clock rates consumes more power. Much higher clock rates can decrease reliability by promoting component failures. However, it is often desirable to use relatively high clock rates to decrease access time through lowering latency, and to increase data transfer rates to and from the dynamic storage subsystem.

Typically, the minimum clock rate is used until an access request is made at which time a second and higher clock rate is used in an attempt to reduce latency. Often a third clock rate is used to optimize transfer rate. However, each of these transfer rates tend to be asynchronous with respect to the rate at which the requestor is operating. This at times results in suboptimal transfer rates and at other times results in overrun.

The teachings of van Es, et al, in U. S. Pat. No. 4,040,027 solve a similar problem in tending to optimize the transfer rate from a mechanical device such as a paper tap reader. Van Es, et al, use a buffer memory between the paper tape reader and the requesting user device. The paper tape reader is turned on to cause the buffer memory to be continuously loaded to a first filling degree at which time the motor of the paper tape reader is turned off until the buffer is emptied by the requestor to a second filling degree. Unfortunately, the apparatus and techniques taught by Van Es, et al, cannot be used in CCD storage subsystems which would lose their data if the control clock were stopped. Furthermore, the paper tape reader in Van Es, et al, reads at only one speed because of the difficulty in controlling the speed of the motor. A CCD storage subsystem, however, can be operated at variable speeds, providing the opportunity to minimize the probability of overrun.

SUMMARY OF THE INVENTION

The present invention adds a variable rate oscillator and a FIFO buffer to a dynamic storage subsystem based upon CCD or an analogous technology. The rate at which the dynamic storage subsystem is clocked is controlled by the variable rate oscillator. At such times as no access request is being honored, the variable rate oscillator clocks the dynamic storage subsystem at some minimum rate consistent with reliable operation in order to conserve power and extend the life of the storage devices.

Upon receiving an access request, the variable rate oscillator increases its frequency to the maximum rate until the dynamic storage subsystem is ready to access the desired addressable locations. This readiness is determined by matching the requested address with the dynamic storage subsystem current address. If a write access has been requested, the variable rate oscillator changes to the minimum rate after the match is found. If a read access has been requested, the variable rate oscillator remains at the maximum rate.

Data transfers to and from the dynamic storage subsystem are via the FIFO buffer. For a write access, data is transferred from the requestor to the FIFO buffer at a rate determined by the requestor. The data is then transferred from the FIFO buffer to the dynamic storage subsystem at a rate determined by the variable rate oscillator. For a read access, data is transferred from the dynamic storage subsystem to the FIFO buffer at a rate determined by the variable rate oscillator. The data is then transferred from the FIFO buffer to the requestor at a rate determined by the requestor.

During the time that data is being transferred to and from the FIFO buffer, the frequency of the variable rate oscillator is determined by the amount of data currently resident in the FIFO buffer. For write accesses, the more data resident in the FIFO buffer, the higher the frequency of the variable rate oscillator tending to decrease the quantity of data in the FIFO buffer. The less data resident in the FIFO buffer, the lower the frequency of the variable rate oscillator, tending to increase the quantity of data in the FIFO buffer.

For read accesses, the more data resident in the FIFO buffer, the lower the frequency of the variable rate oscillator tending to decrease the quantity of data in the FIFO buffer. The less data resident in the FIFO buffer, the higher the frequency of the variable rate oscillator, tending to increase the quantity of data in the FIFO buffer.

By using the FIFO buffer to control the variable rate oscillator, the requestor and dynamic storage subsystem clocks are effectively synchronized providing optimal transfer rates. A second advantage to the present invention is a severe reduction in the risk of overrun. Overrun occurs when a desired addressable location shifts past the access point requiring a latency wait which is the time required for the desired addressable location to again shift to the access point.

BRIEF DESCRIPTION OF THE DRAWINGS

FIG. 4, containing FIG. 4a and FIG. 4b, illustrates the preferred embodiment of the variable rate oscillator and corresponding control circuitry.

DESCRIPTION OF THE PREFERRED EMBODIMENT

The present invention was built and testing using a charge coupled device (CCD) dynamic storage subsystem, although it is clear that dynamic storage subsystems of other types will also benefit by the techniques taught herein.

Figure 1:
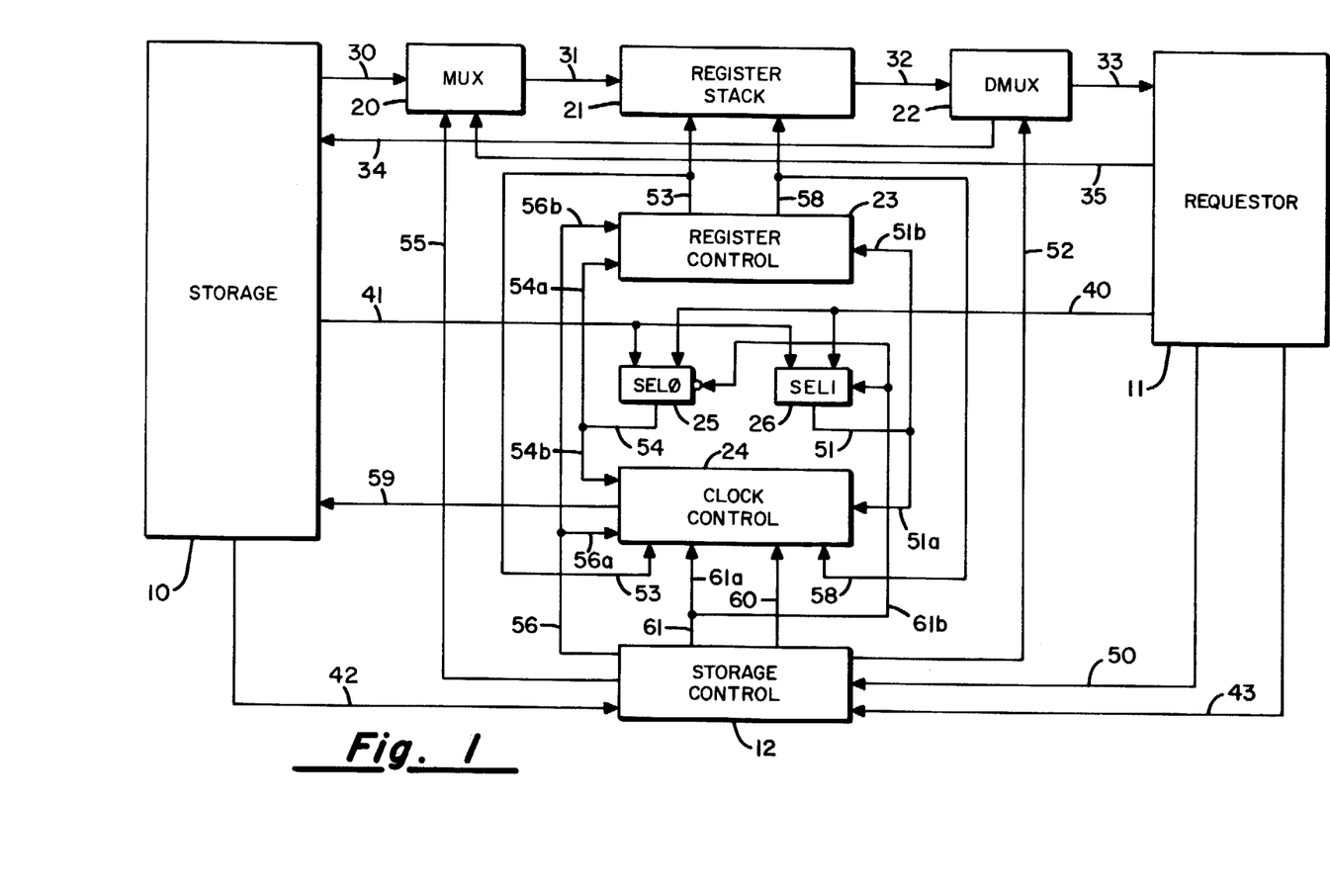
FIG. 1 shows a dynamic storage subsystem incorporating the present invention connected to a requestor.

FIG. 1 shows REQUESTOR 11 coupled to the dynamic storage subsystem, STORAGE 10. The actual data transfers between STORAGE 10 and REQUESTOR 11 are word parallel using a 32 bit word width although other word widths may be used. For write accesses, REQUESTOR 11 transfers data to the input multiplexer, MUX 20, via line 35. STORAGE CONTROL 12 notifies MUX 20 via line 55 that a write access is in process, causing MUX 20 to select the data received via line 35 (rather than line 30) for input to REGISTER STACK 21 via line 31. REGISTER STACK 21 functions as a first-in-first-out, FIFO, buffer having storage for four 32-bit words. Control of REGISTER STACK 21 is exercised by REGISTER CONTROL 23 via lines 53 and 58 for input to an output from REGISTER STACK 21, respectively. The operation of REGISTER STACK 21 and REGISTER CONTROL 23 is discussed in detail below. Data output from REGISTER STACK 21 is transferred to output demultiplexer, DMUX 22, via line 32. STORAGE CONTROL 12 notifies DMUX 22 via line 52 that a write access is in process causing DMUX 22 to output the data to STORAGE 10 via line 34 rather than to REQUESTOR 11 via line 33.

For read accesses, data is transferred from STORAGE 10 to MUX 20 via line 30. STORAGE CONTROL 12 notifies MUX 20 via line 55 that a read access is in process causing MUX 20 to transfer the data received via line 30 to REGISTER STACK 21 via line 31. Data is received from REGISTER STACK 21 by DMUX 22 via line 32. DMUX 22 is notified by STORAGE CONTROL 12 via line 52 that a read access is in process causing DMUX 22 to transfer the data received via line 32 to REQUESTOR 11 via line 33. Note that MUX 20 and DMUX 22 may be implemented using commonly available monolithic devices.

As explained above, REGISTER STACK 21 contains four 32-bit registers which are controlled by REGISTER CONTROL 23 via lines 53 and 58 to operate as a FIFO buffer. REGISTER CONTROL 23 receives a clear signal from STORAGE CONTROL 12 via line 56b upon initiation of an access (either read access or write access). REGISTER CONTROL 23 also receives an input clock signal via line 54a and an output clock signal via line 51b. The input clock selector, SEL$\phi$ 25, and the output clock selector, SEL1 26, supply these clock signals. Line 61b causes SEL$\phi$ 25 to select the clock signal received from STORAGE 10 via line 41 as input clock for read accesses and the clock signal received from REQUESTOR 11 via line 40 as input clock for write accesses. Similarly, line 61b causes SEL1 26 to select as the output clock the clock signal from line 41 for read accesses and the clock signal from line 40 write accesses. SEL$\phi$ 25 and SEL1 26 are commonly available monolithic devices.

CLOCK CONTROL 24 contains the variable rate oscillator and associated control circuitry. The output which is supplied to STORAGE 10 via line 59 is used to clock the data within STORAGE 10. CLOCK CONTROL 24 receives input clock via line 54b and output clock via line 51a. CLOCK CONTROL 24 also receives the clear signal from STORAGE CONTROL 12 via line 56a. REGISTER CONTROL 23 also supplies to CLOCK CONTROL 24 via lines 53 and 58, the signals used to control REGISTER STACK 21.

STORAGE CONTROL 12 supplies the interface logic which provides overall control of STORAGE 10. STORAGE CONTROL 12 receives the access request control signal via line 50 which initiates operation. The clear signal transferred via line 56 is initiated in response thereto. The enable fast clock signal is impressed upon line 60. The desired access address is also transferred from REQUESTOR 11 to STORAGE CONTROL 12 to STORAGE 10 via lines which are not shown. Upon receiving an access request, STORAGE CONTROL 12 indicates a read access via line 61 which decreases latency as discussed below. Upon approaching the desired access address, STORAGE 10 notifies STORAGE CONTROL 12 via line 42. STORAGE CONTROL 12 then interrogates line 43 by which REQUESTOR 11 indicates whether the desired access is a read access or write access. Lines 52, 55, and 61 are then set to correspond to whether the desired access in a read access or a write access. The data transfer then occurs as discussed above.

Figure 2:
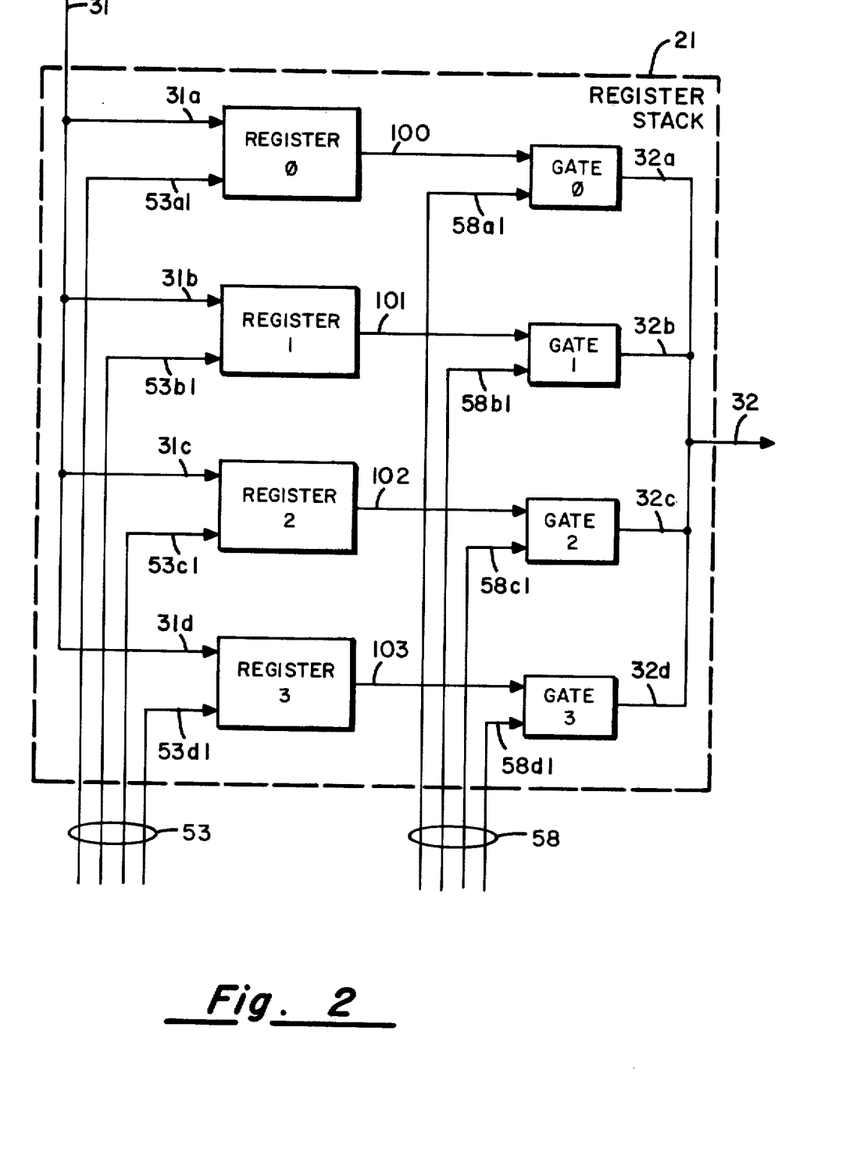
FIG. 2 shows the register stack used as a FIFO buffer in the preferred embodiment.

FIG. 2 shows the construction of REGISTER STACK 21. Each 32 bit data word received by REGISTER STACK 21 is received via line 31. Each 32 bit data word transferred from REGISTER STACK 21 is transferred via line 32. Line 53 controls the input to REGISTER STACK 21 and line 58 controls the output from REGISTER STACK 21. The four 32-bit registers are designated REG$\phi$, REG1, REG2, and REG3. Each of these receives each 32-bit word transferred via line 31. A 32-bit word is latched in the appropriate one of the four registers by a latch signal received by the corresponding one of the four conductors of line 53. A latch signal present on line 53a, for example, causes the 32-bit data word received via line 31a to be loaded into REG$\phi$. Similarly, a latch signal present on line 53b1 loaded into REG1. A latch signal present on line 53c1 causes the 32-bit data word received via line 31c to be loaded into REG2. And a latch signal present on line 53d1 causes the 32-bit data word received via line 31d to be loaded into REG3.

The 32 contents of each of the four 32-bit registers in transferred to a corresponding one of four 32-bit gates. The contents of REG$\phi$ are transferred via line 100 to GATE$\phi$. The contents of REG1 are transferred to GATE1 via line 101. The contents of REG2 are transferred to GATE2 via line 102. And the contents of REG3 are transferred via line 103 to GATE3. The output of each of the four gates is controlled by the corresponding one of the four conductors of line 58. Line 58a1, for example, enables the input of GATE$\phi$ received via line 100 to line 32a. Line 101 is enabled by line 58b1 to line 32b. Upon enablement via line 58c1, GATE2 gates the contents of line 102 to line 32c. And line 32d receives the contents of line 103 upon enablement of GATE3 via line 58d1. Lines 32a, 32b, 32c, and 32d are wired-ored to produce the 32-bit output of REGISTER STACK 21 transferred via line 32. By having only one of the four gates enabled at a time, line 32 transfers the contents of the one of the four registers as selected by line 58.

Figure 3:
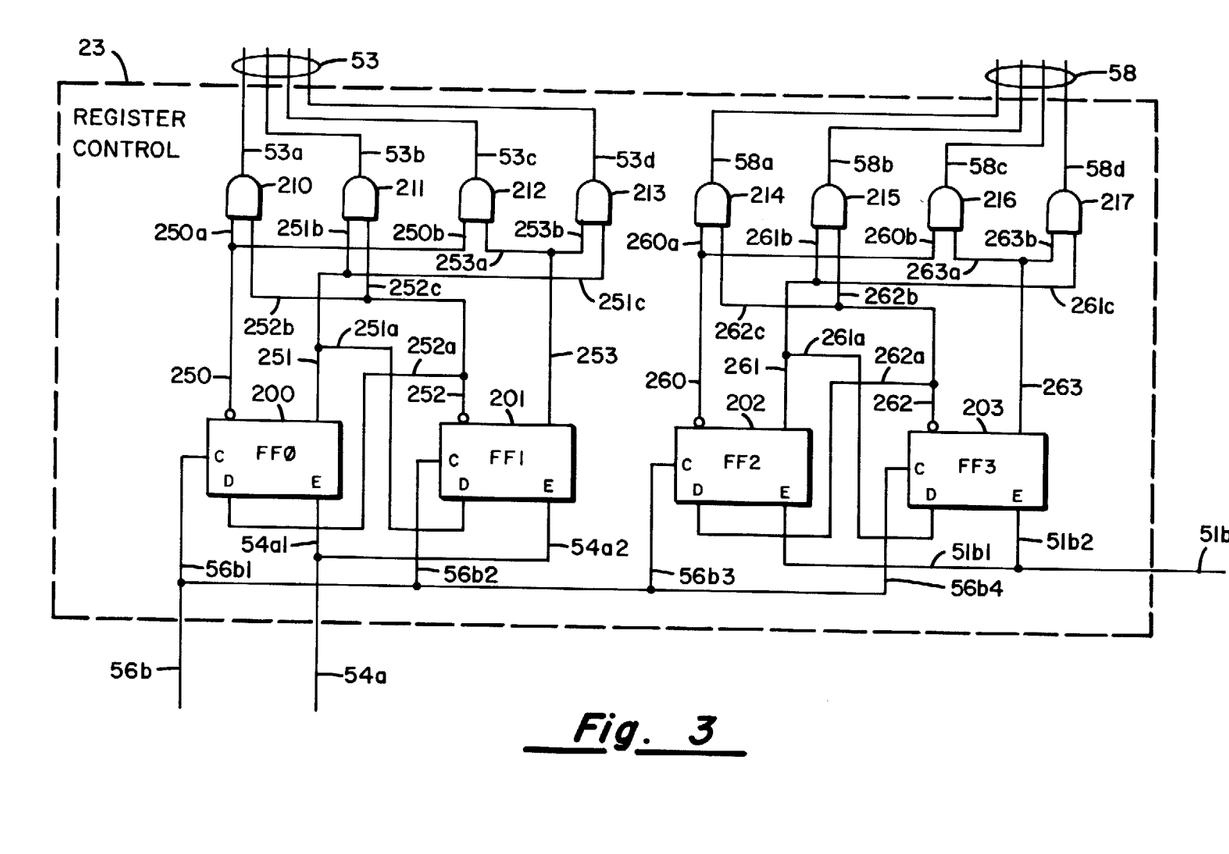
FIG. 3 shows the register control circuit used to control the operation of the register stack.
Figure 5:
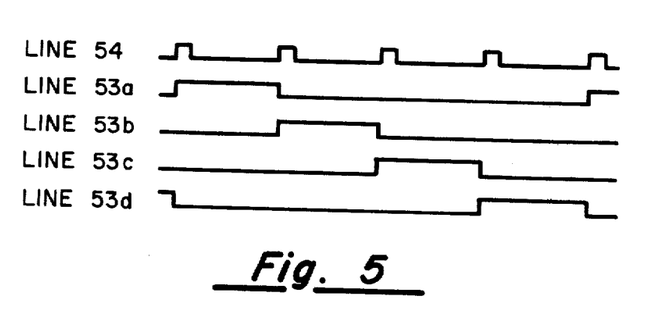
FIG. 5 shows the timing of the register stack input control signals.

The details of REGISTER CONTROL 23 are shown in FIG. 3. As stated above, line 56b provides a clear signal to each of the four "D" (i.e., data) type flip-flops, FF$\phi$ 200, FF1 201, FF2 202, and FF3 203. FF$\phi$ 200 and FF1 201 are configured, using lines 251a and 252a, as a two bit counter. Each input clock signal received via line 54a (i.e., lines 54a1 and 54a2) causes the two bit counter to be incremented by one. AND gates 210, 211, 212, and 213 translate the outputs of FF$\phi$ 200 and FF1 201 as energizing one of the four conductors of line 53. Table A and FIG. 5 show the operation of FFφ 200, FF1 201, AND 210, AND 211, AND 212, and AND 213.

Figure 6:
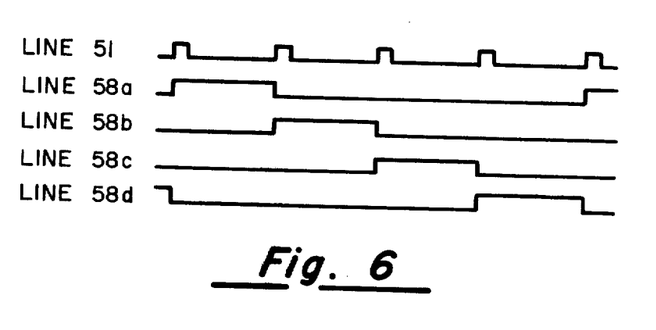
FIG. 6 shows the timing of the register stack output control signals.

Similarly, FF2 202 and FF3 203 are connected via lines 261a and 262a as a two-bit counter. AND gates 214, 215, 216, and 217 translate the output to supply an enable on one of the four conductors of line 58. Table B and FIG. 6 show the operation of FF2 202, FF3 203, AND 214, AND 215, AND 216, and AND 217.

TABLE A

| INPUT CLOCK PULSE (LINE 54) | FF0 200 | FF1 201 | LINE 53a | LINE 53b | LINE 53c | LINE 53d |
|---|---|---|---|---|---|---|
| 0 | CLEAR | CLEAR | HIGH | LOW | LOW | LOW |
| 1 | SET | CLEAR | LOW | HIGH | LOW | LOW |
| 2 | CLEAR | SET | LOW | LOW | HIGH | LOW |
| 3 | SET | SET | LOW | LOW | LOW | HIGH |
| 4 | CLEAR | CLEAR | HIGH | LOW | LOW | LOW |
| 5 | SET | CLEAR | LOW | HIGH | LOW | LOW |
| 6 | CLEAR | SET | LOW | LOW | HIGH | LOW |
| 7 | SET | SET | LOW | LOW | LOW | HIGH |
| 8 | CLEAR | CLEAR | HIGH | LOW | LOW | LOW |

TABLE B

| OUTPUT CLOCK PULSE (LINE 51) | FF2 202 | FF3 203 | LINE 58a | LINE 58b | LINE 58c | LINE 58d |
|---|---|---|---|---|---|---|
| 0 | CLEAR | CLEAR | HIGH | LOW | LOW | LOW |
| 1 | SET | CLEAR | LOW | HIGH | LOW | LOW |
| 2 | CLEAR | SET | LOW | LOW | HIGH | LOW |
| 3 | SET | SET | LOW | LOW | LOW | HIGH |
| 4 | CLEAR | CLEAR | HIGH | LOW | LOW | LOW |
| 5 | SET | CLEAR | LOW | HIGH | LOW | LOW |
| 6 | CLEAR | SET | LOW | LOW | HIGH | LOW |
| 7 | SET | SET | LOW | LOW | LOW | HIGH |
| 8 | CLEAR | CLEAR | HIGH | LOW | LOW | LOW |

Figures 4, 4A:
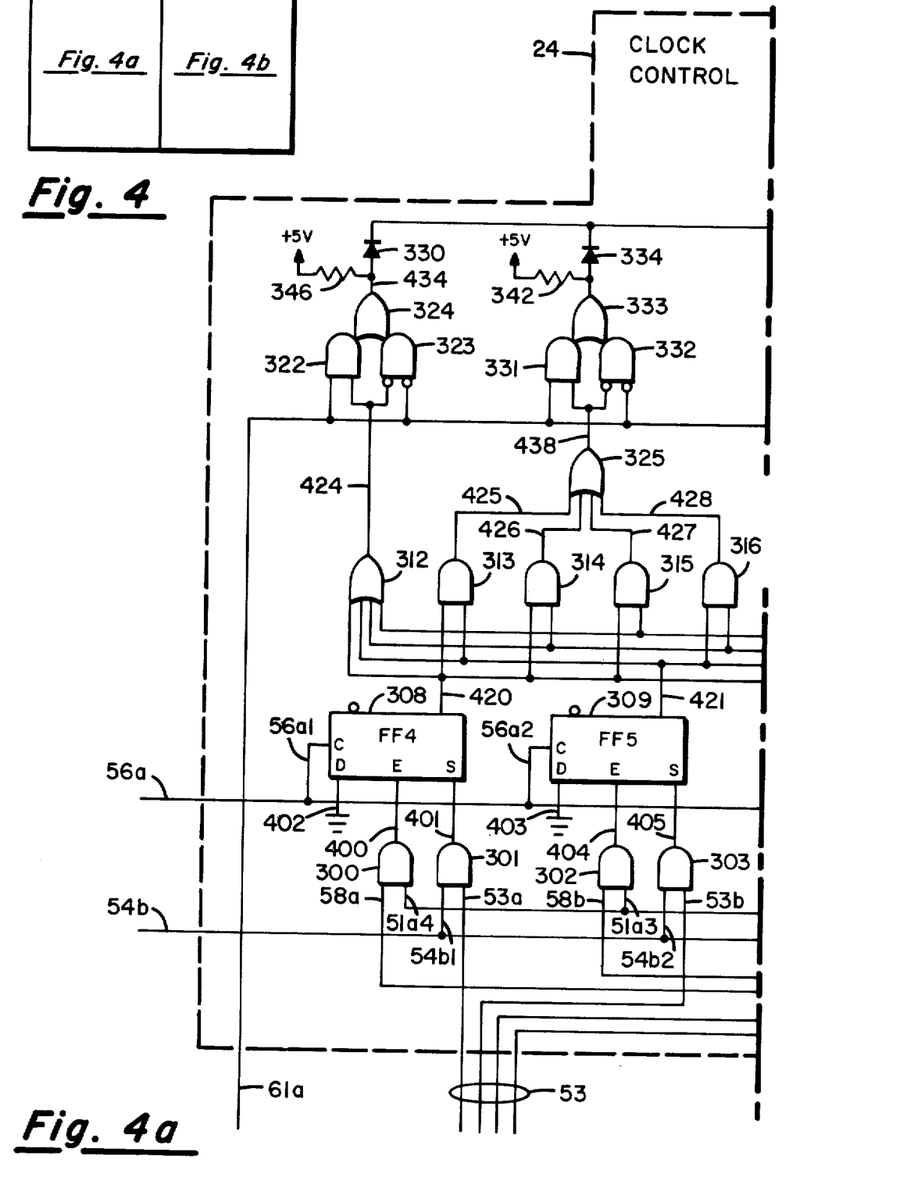
Figure 4B:
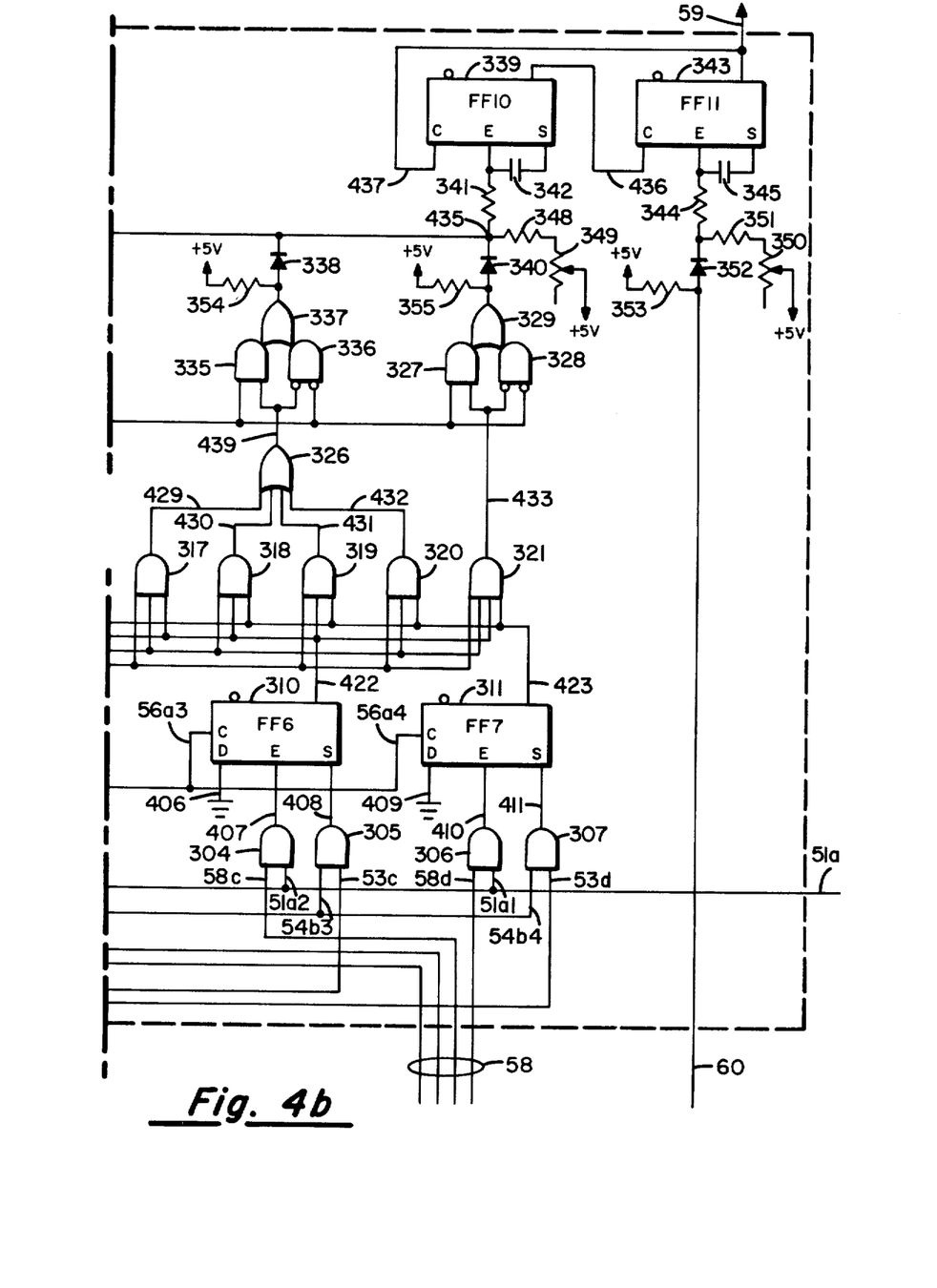

FIG. 4 shows the variable rate oscillator and associated control circuitry collectively termed CLOCK CONTROL 24. The variable rate oscillator uses FF10 339 and FF11 343 wired via lines 436 and 437 as a monostable multivibrator. FF10 339 and FF11 343 are standard monolithic circuits 74123. The output is transferred via line 59. Capacitors 342 and 345 are 200 picofarads. Resistors 341, 344, and 353 are 5,000 ohms each. Resistors 348 and 351 are 20,000 ohms. Reostats 349 and 350 are 20,000 ohms. Though in specific production configurations, Reostats 349 and 350 may be replaced by fixed resistors, it has proven convenient to date to have the adjustment capability. Line 60 is set to a high to enable the multivibrator (i.e., FF10 339 and FF11 343) to oscillate at a maximum rate. This is called enable fast clock.

Figure 7:
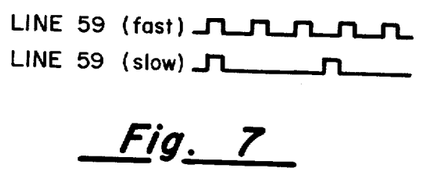
FIG. 7 shows the range of variable rate oscillator output.

FIG. 7 shows the range of oscillator rates. To accommodate the CCD dynamic storage subsystem of the preferred embodiment, the fast rate was chosen as 2.5 megahertz and the slow rate was chosen as 1.0 megahertz. Reostats 349 and 350 are adjusted to provide this range. See FIG. 4.

In operation, the oscillator rate is determined by OR-gates 324, 333, 337, and 329. An output of high by any of these four OR-gates tends to raise the voltage of line 435, source additional positive current and decrease the impedance between line 435 and the positive five volt power source. Likewise, an output of low by any of these four OR-gates tends to lower the voltage of line 435, sink additional current and increase the impedance between line 435 and the positive five volt power source. Therefore, if the output of all four OR-gates (i.e., 324, 333, 337, and 329) are high, line 435 is at the maximum voltage and the variable rate oscillator operates at the maximum (2.5 megahertz) rate. Similarly, if the output of all four OR-gates are low, line 435 is at the minimum voltage and the variable rate oscilltor operates at the minimum (1.0 megahertz) rate. OR-gates 324, 333, 337, and 329 are coupled to line 435 via diodes 330, 334, 338, and 340, respectively. Pullup-resistor 346 has a value of 1,000 ohms. Resistor 342 has a value of 2,000 ohms. Resistor 354 has a value of 3,000 ohms. And resistor 355 has a value of 2,000 ohms.

As can be seen from FIG. 4, the output of each of the four OR-gates, 324, 333, 337, and 329, is determined by the state of line 61a and combinations of the states of the four control flip-flops, FF4 308, FF5 309, FF6 310, and FF7 311. As explained earlier, line 61a indicates whether an access is a read access or a write access. Line 61a is at a high state for a read access and at a low state for a write access. However, because a high state on line 61a provides the maximum frequency of the variable rate oscillator for all four control flip-flops clear, line 61a is always a high until the desired access address in available, thereby shortening the latency for write accesses as well as read accesses.

Each one of the four control flip-flops (i.e., FF4 308, FF5 309, FF6 310, and FF7 311) correspond to one of the four 32-bit registers of REGISTER STACK 21. FF4 308 corresponds to REGφ. FF5 309 corresponds to REG1. FF6 310 corresponds to REG2. and FF7 311 corresponds to REG3. When a one of the four 32-bit registers of REGISTER STACK 21 is loaded with a data word, the corresponding one of the four control flip-flops is set. Similarly, when the contents of a one of the four 32-bit registers of REGISTER STACK 21 is enabled to output, the corresponding one of the four flip-flops is cleared. As shown in FIG. 4, the coincidence of the input clock signal received via line 54b1 and the latch signal to REGφ received via line 53a, causes FF4 308 to be set via AND gate 310 and line 401. (See also FIG. 2 and FIG. 3.) Similarly, FF5 309 is set via line 405 and AND gate 303 as a result of a latch signal to REG1 received via line 53b and the input clock signal received via line 54b2. FF6 310 is set via AND gate 305 and line 408 as a result of a latch signal to REG2 received via line 53c and the input clock signal received via line 54b3. Similarly, a latch signal to REG3 received by AND gate 307 via line 53d and the input clock signal on line 54b4 causes FF7 311 to be set via line 411.

After being set, a one of the four control flip-flops is cleared when the coresponding one of the four 32-bit registers of register STACK 21 is enabled for output. For example, the coincidence of the output clock received via line 51a4 and the enable for output of REGφ received via line 58a causes the state of FF4 308 to be changed (i.e., FF4 308 is cleared if previously set). The remaining three control flip-flops are cleared in similar fashion. It can be seen that the four control flip-flops, therefore, maintain a record of which of the four 32-bit registers of REGISTER STACK 21 currently contain data which is being buffered for output. Stated another way, the four control flip-flops maintain a record of which of the four 32-bit registers of REGISTER STACK 21 are in use. For write accesses, the frequency of the variable rate oscillator will be increased as the number of 32-bit registers in use is increased and will be decreased as the number of 32-bit registers in use is decreased. Conversely, for read accesses, the frequency of the variable rate oscillator will be decreased as the number of 32-bit registers in use is increased and will be increased as the number of 32-bit registers in use is decreased.

OR-gate 312 determines whether at least one of the four 32-bit registers (of REGISTER STACK 21) is currently in use (i.e., has been loaded but not enabled for output). OR-gate 312 forces line 424 high if at least one of the four 32-bit registers is in use. AND gates 313, 314, 315, and 316 along with OR-gate 325 determine if at least two of the four 32-bit registers are in use. Line 438 is high if at least two of the four 32-bit registers are in use. Similarly, line 439 is driven high by OR-gate 326 if any of AND gates 317, 318, 319, and 320 determine that at least three of the four 32-bit registers are in use. If all four 32-bit registers are in use, AND gate 321 drives line 433 high.

For read accesses, one 32-bit register in use, two 32-bit registers in use, three 32-bit registers in use, and four 32-bit registers each individually and jointly tend to decrease the frequency of the variable rate oscillator via AND gates 322, 331, 335, and 327 as enabled by the high read access signal on line 61a. Conversely, for write accesses, one 32-bit register in use, two 32-bit registers in use, three 32-bit registers in use, and four 32-bit registers in use each individually and jointly tend to increase the frequency of the variable rate oscillator via AND gates 323, 332, 336, and 328 as enabled by the low write access signal on line 61a.

Figure 8:
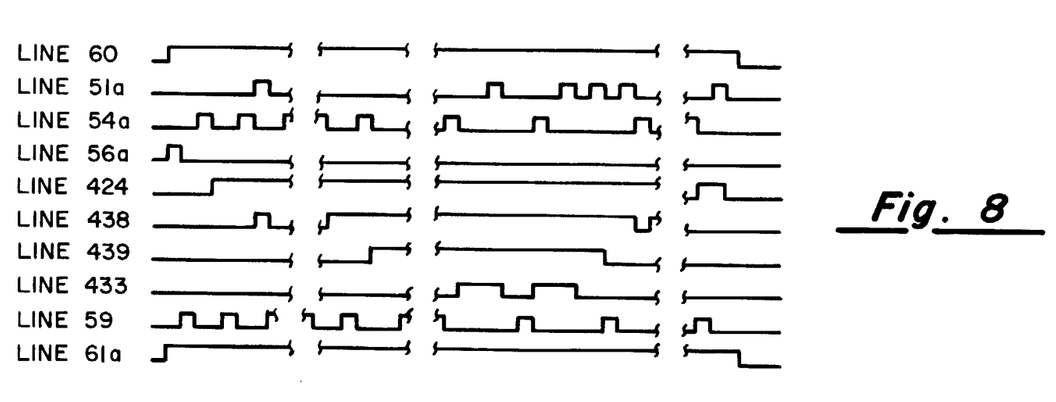
FIG. 8 shows the timing of variable rate oscillator control circuitry for read accesses.
Figure 9:
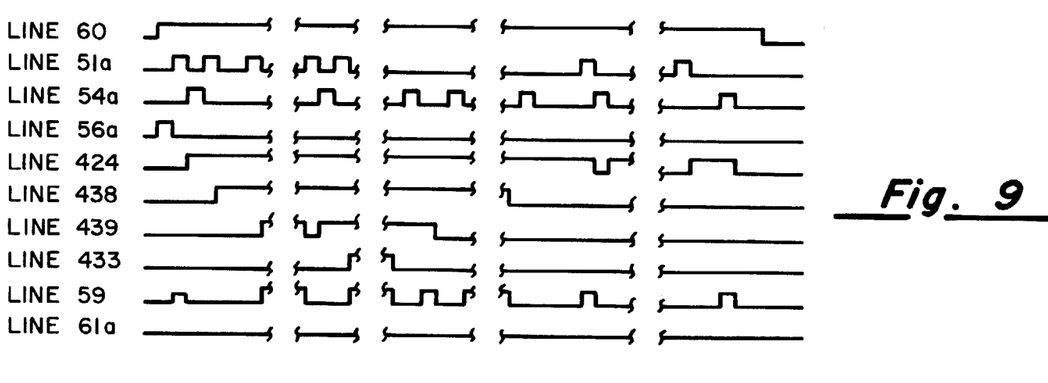
FIG. 9 shows the timing of variable rate oscillator control circuitry for write accesses.

FIG. 8 shows the timing of a read access. Notice that line 60 which enables the fastest rate of the variable rate oscillator is set high as in line 61a to indicate a read access. Notice also the effect of the one, two, three, and four 32-bit register in use signals on lines 424, 438, 439, and 433, respectively, upon line 59, the output of the variable rate oscillator. FIG. 9 shows the timing of a write access. Notice that the output of the variable rate oscillator (i.e., line 59) responds to the states of line 424, 438, 439, and 433 in a manner inverse to that of the manner for the read access.

What is claimed is:

1. In a data processing system having a dynamic storage subsystem capable of being written into wherein said dynamic storage subsystem writes data in response to a first control clock and having a requestor capable of accessing said dynamic storage subsystem to write into said dynamic storage subsystem wherein said requester tranfers data to be written into said dynamic storage subsystem in response to a second control clock, the improved method of controlling the rate of transferring data to be written into said dynamic storage subsystem from said requestor to said dynamic storage subsystem comprising:
  (a) transferring data to be written into said dynamic storage subsystem from said requestor to a first-in-first-out buffer memory in response to said second control clock;
  (b) transferring data to be written into said dynamic storage subsystem from said first-in-first-out buffer memory to said dynamic storage subsystem in response to said first control clock;
  (c) sensing constantly a change in the amount of data to be written into said dynamic storage subsystem which is stored within said first-in-first-out buffer memory;
  (d) increasing the rate of said first control clock when said change in the amount of data to be written into said dynamic storage subsystem which is stored within said first-in-first-out buffer memory increases; and
  (e) decreasing the rate of said first control clock when said change in the amount of data to be written into said dynamic storage subsystem which is stored within said first-in-first-out buffer memory decreases.

2. In a data processing system having a dynamic storage subsystem capable of being read from wherein said dynamic storage subsystem reads data in response to a first control clock and having a requestor capable of accessing said dynamic storage subsystem to read from said dynamic storage subsystem wherein said requestor receives data read from said dynamic storage subsystem in response to a second control clock, the improved method of controlling the rate of data read from said dynamic storage subsystem for transfer to said requestor comprising:
  (a) transferring data read from said dynamic storage subsystem into a first-in-first-out buffer memory in response to said first control clock;
  (b) transferring data read from said dynamic storage subsystem from said first-in-first-out buffer memory to said requestor in response to said second control clock;
  (c) sensing constantly a change in the amount of data read from said dynamic storage subsystem stored within said first-in-first-out buffer memory;
  (d) decreasing the rate of said first control clock when said change in the amount of data read from said dynamic storage subsystem which is stored within said first-in buffer memory increases; and
  (e) increasing that rate of said first control clock when said change in the amount of data read from said dynamic storage subsystem which is stored within said first-in-first-out buffer memory decreases.

3. In a data processing system having a dynamic storage subsystem requiring a first continuous clock signal to permit reliable storage of data wherein said first continuous clock signal determines the rate at which data is written into said dynamic storage subsystem and having a requestor responsively coupled to said dynamic storage subsystem with the capability to write data into said dynamic storage subsystem wherein the rate at which said requestor can write data into said dynamic storage subsystem is determined by a second clock signal, the improvement comprising:
  memory responsively coupled to said dynamic storage subsystem and said requestor whereby data to be written into said dynamic storage subsystem from said requestor is written into said memory from said requestor at a rate determined by said second clock signal and whereby data to be written into said dynamic storage subsystem is transferred from said memory to said dynamic storage subsystem at a rate determined by said first continuous clock signal;
  means responsively coupled to said dynamic storage subsystem for generating said first continuous clock signal;
  means responsively coupled to said memory for sensing the amount of data to be written into said dynamic storage subsystem which has been transferred from said requestor to said memory but which has not been transferred from said memory to said dynamic storage subsystem; and means responsively coupled to said generating means and said sensing means for controlling the rate of said first continuous clock signal whereby the rate of said first continuous clock signal is increased if the amount of data to be written into said dynamic storage subsystem which has been transferred from said requestor to said memory but which has not been transferred from said memory to said dynamic storage subsystem as sensed by said sensing means increases and whereby the rate of said first continuous clock signal is decreased if the amount of data to be written into said dynamic storage subsystem which has been transferred from said requestor to said memory but which has not been transferred from said memory to said dynamic storage subsystem as sensed by said sensing means decreases.

4. In a data processing system having a dynamic storage subsystem requiring a first continuous clock signal to permit reliable storage of data wherein said first continuous clock signal determines the rate at which data is read from said dynamic storage subsystem and having a requestor responsively coupled to said dynamic storage subsystem with the capability to read data from said dynamic storage subsystem wherein the rate at which said requestor can read data from said dynamic storage subsystem is determined by a second clock signal, the improvement comprising:

a memory responsively coupled to said dynamic storage subsystem and said requestor whereby data to be read from said dynamic storage subsystem by said requestor is written into said memory from said dynamic storage subsystem at a rate determined by said first continuous clock signal and whereby data to be read from said dynamic storage subsystem by said requestor is transferred from said memory to said requestor at a rate determined by said second clock signal;

means responsively coupled to said dynamic storage subsystem for generating said first continuous clock signal;

means responsively coupled to said memory for sensing the amount of data to be read from said dynamic storage subsystem by said requestor which has been transferred from said dynamic storage subsystem to said memory but which has not been transferred from said memory to said requestor; and means responsively coupled to said generating means and said sensing means for controlling the rate of said first continuous clock signal whereby the rate of said first continous clock signal is decreased if the amount of data to be read from said dynamic storage subsystem by said requestor which has been transferred from said dynamic storage subsystem to said memory but which has not been transferred from said memory to said requestor as sensed by said sensing means increases and whereby the rate of said first continuous clock signal is increased if the amount of data to be read from said dynamic storage subsystem by said requestor which has been transferred from said dynamic storage subsystem to said memory but which has not been transferred from said memory to said requestor as sensed by said sensing means decreases.

5. A data processing system according to claims 3 or 4 whereby said memory further comprises:
a first-in-first-out buffer memory.

* * * * *